United States Patent [19]

Nagano et al.

[11] Patent Number: 4,658,289
[45] Date of Patent: Apr. 14, 1987

[54] COLOR-PICTURE ANALYZING APPARATUS FOR CONTINUOUSLY SWITCHING-ON GREEN LAMP AND FOR ALTERNATIVELY SWITCHING-ON BLUE AND RED-PURPOSE LAMPS

[75] Inventors: Fumikazu Nagano; Toshio Urakawa, both of Yamatokoriyama, Japan

[73] Assignee: Sharp Kabushiki Kaisha, Osaka, Japan

[21] Appl. No.: 688,680

[22] Filed: Jan. 4, 1985

[30] Foreign Application Priority Data

Jan. 12, 1984 [JP] Japan .................................. 59-4057

[51] Int. Cl.[4] .............................................. H04N 1/46
[52] U.S. Cl. ...................................... 358/75; 358/41; 358/80
[58] Field of Search ...................... 358/75, 78, 80, 41; 382/17; 355/4, 35, 37, 38; 356/402, 404–407, 425; 250/226, 578

[56] References Cited

U.S. PATENT DOCUMENTS 4,318,122 3/1982 White .................................. 358/75

FOREIGN PATENT DOCUMENTS

| 30214 | 3/1980 | Japan | 358/75 |
| 97772 | 7/1980 | Japan | 358/75 |
| 131873 | 10/1980 | Japan | 358/75 |
| 17263 | 1/1982 | Japan | 358/75 |
| 150270 | 9/1982 | Japan | 358/75 |

Primary Examiner—Howard W. Britton
Attorney, Agent, or Firm—Birch, Stewart, Kolasch & Birch

[57] ABSTRACT

A color-picture analyzing apparatus includes a blue, green, and red-purpose lamps, preferably, fluorescent lamps; a sharp-cut filter in front of the red-purpose lamp for solely passing the red radiation; an infrared-cut filter interposed between a document having a color-picture to be analyzed and a reading sensor for cutting an infrared zone radiation; a first circuit for continuously switching on the green lamps; and a second circuit for alternatively switching on the blue and the red-purpose lamps. The red-purpose lamp can provide wide radiations covering the red spectral zone. It may be a cool white fluorescent lamp having a short afterglow time.

4 Claims, 6 Drawing Figures

COLOR-PICTURE ANALYZING APPARATUS FOR CONTINUOUSLY SWITCHING-ON GREEN LAMP AND FOR ALTERNATIVELY SWITCHING-ON BLUE AND RED-PURPOSE LAMPS

BACKGROUND OF THE INVENTION

The present invention relates to a picture reading apparatus and, more particulary, to a color-picture analyzing apparatus suitable for a color facsimile machine, color copying machine, and color scanner.

Conventionally, a color-picture reading apparatus is provided in a color facsimile machine, color copying machine, and color scanner for analyzing the color-picture breaking it down into a red component, green component, or a blue component by optically scanning the color-picture, so that it is electrically converted and outputted. To analyze the red, green, or blue components from an original color-picture, and various types of filters are presented through which reflected radiations from the color-picture are passed to pick-up picture information for a specific wavelength zone.

Some conventional blue fluorescent lamps can respond quickly and have a short afterglow time while conventional red and green fluorescent lamps inevitably have relativey long afterglow times (several tens of milliseconds). It may, therefore, be difficult to provide a superior reading apparatus for rapidly analyzing a color-picture.

SUMMARY OF THE INVENTION

Accordingly, it is an object of the present invention to provide an improved color-picture analyzing apparatus for rapidly analyzing a color-picture.

It is another object of the present invention to provide an improved color-picture analyzing apparatus suitable for a color facsimile machine, color copying machine, or a color scanner, featuring a red-purpose fluorescent lamp that has a short afterglow time.

It is a further object of the present invention to provide an improved color-picture analyzing apparatus for analyzing a color-picture by continuously switching on a green lamp and alternatively switching on a blue and red-purpose lamp, the red-purpose lamp being faced by a sharp-cut filter.

Briefly described, in accordance with the present invention, a color-picture analyzing apparatus suitable for a color facsimile machine, color copying machine, and or a color scanner comprises a blue, green, and red-purpose lamps, preferably, fluorescent lamps, sharp-cut filter means positioned in front of the red-purpose fluorescent lamp for solely passing the red radiation, infrared-cut filter means interposed between a document and reading sensor means for cutting an infrared zone radiation, and means for continuously switching on the green lamp and for alternatively switching the blue and the red-purpose lamps. The red-purpose lamp is a lamp that sufficiently covers the red zone. It may be a cool white fluorescent lamp having a short afterglow time.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
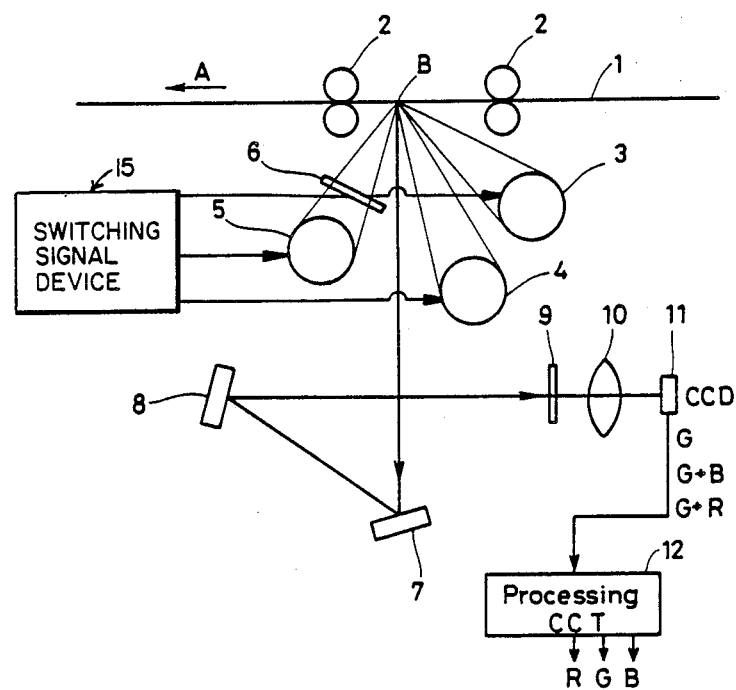
FIG. 1 is a side view of a color-picture analyzing apparatus according to the present invention.

FIG. 1 is a side view of a color-picture analyzing apparatus of the present invention. It is applicable to a color facsimile, color copying machine, or color scaner.

With reference to FIG. 1, a document 1 having thereon a color-picture to be read-out is constantly transported along the direction of the arrow "A" by transport means comprising two pairs of rollers 2. "B" point of the document 1 denotes an analyzing position for analyzing the color-picture on the document 1. To emit light toward the document 1, three light emitting sources 3, 4 and 5 are provided connected to switching signal device 15. The reflected light from the document 1 is reflected by two reflection mirros 7 and 8. An infrared-cut filter 9 is provided for enabling the reflected light to pass through and to thereby be incident upon a reading lens 10. The light passing through the reading lens 10 is applied to a charge coupled device (CCD) image sensor 11, so that it provides signals corresponding to the light into a processing circuit 12 calculating the color-signals. The circuit 12 may comprise a subtraction circuit.

In connection with the three light sources 3, 4, and 5, the light source 3 is a green fluorescent lamp for propagating light having green spectral characteristics. It has a conventional long afterglow time of several 10 of msec. The term "afterglow time" is referred to as the interval when the lamp continues to propagate some radiation after the power supply to the lamp has been shut off. During their respective afterglow times, the spectral characteristics of all the fluorescent lamps used in the present invention are unchanged although their emission level is relatively small.

Figure 3:
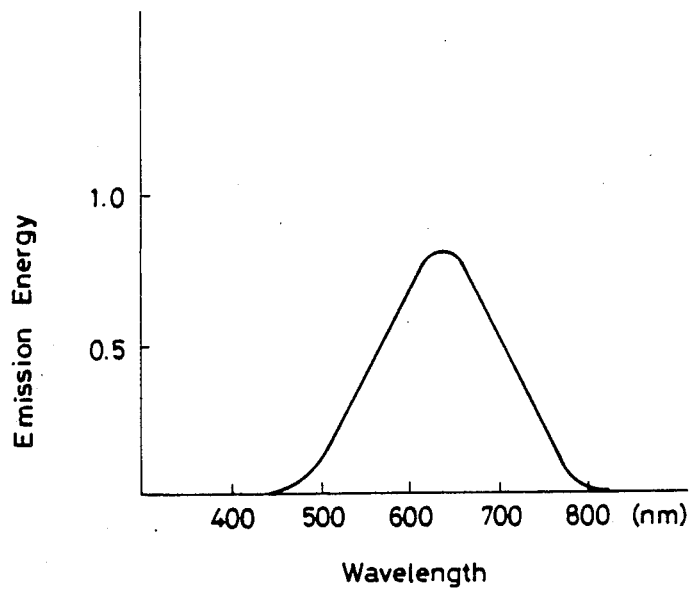
FIG. 3 is a graph showing the spectral emission characteristics of a red-purpose fluorescent lamp used in the apparatus of FIG. 1.

The source 4 is a blue fluorescent lamp for propagating light having blue spectral emission characteristics. It has a short afterglow time. The source 5 is a red-purpose fluorescent lamp for propagating light having the red spectral emission zone with spectral characteristics having a broad spread as shown in FIG. 3, and a short afterglow time. For example, the red-purpose fluorescent lamp 5 may be composed of a fluorescent material of trade name, "SPD-103A", available from Toshiba Corporation, Japan. The "SPD-103A" can provide a short afterglow time of about 10 micro sec. The red-purpose fluorescent lamp 5 can be called a cool white type although should not limited to this type so long as it can emit the light covering the red spectral zone.

Figure 2:
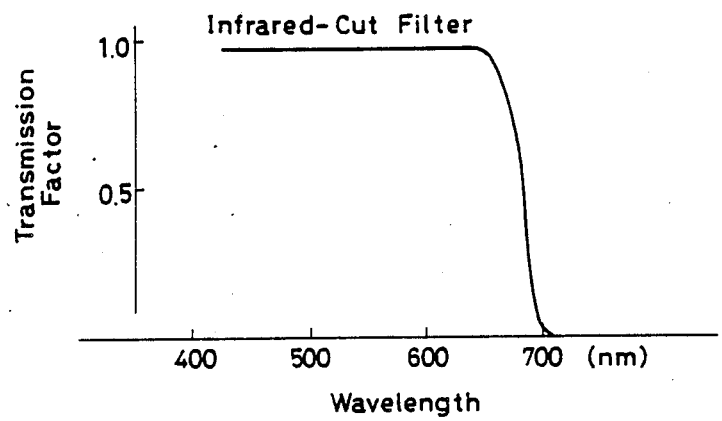
FIG. 2 is a graph showing the spectral characteristics of an infrared-cut filter used in the present invention.

FIG. 2 shows a graph showing the spectral characteristics of the infrared-cut filter 9 for cutting light in the infrared zone so as to improve the resolution when analyzing the color document.

Figure 4:
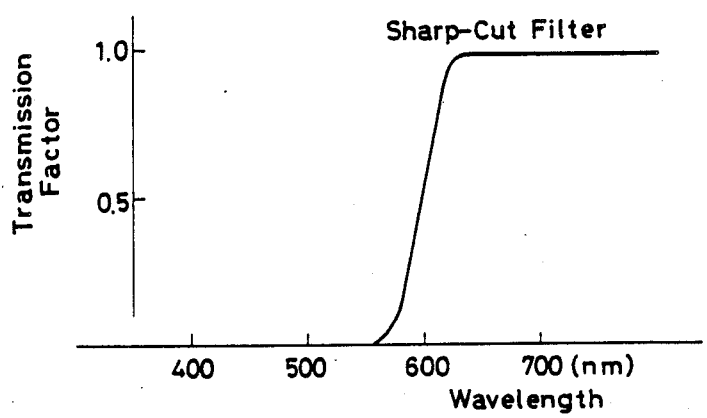
FIG. 4 is a graph showing the spectral characteristics of a sharp-cut filter used for in present invention.
Figure 5:
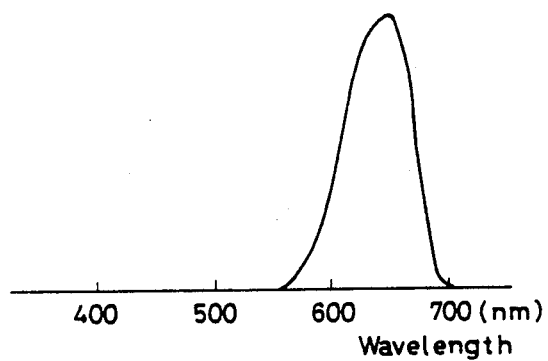
FIG. 5 is a graph showing the spectral emission characteristics of the red-purpose fluorescent lamp of FIG. 3 used sharp-cut filter having the characteristics of FIG. 4, and the infrared-cut filter having the characteristics of FIG. 2.

A sharp-cut filter 6 is interposed between the red-purpose fluorescent lamp 5 and the document 1. The sharp-cut filter 6 has the spectral transmission characteristics as shown in FIG. 4 characterized in light that it shows a high transmission factor in a specific zone. Therefore, the light eventually emitted from the red-purpose fluorescent lamp 5 and passing through the sharp-cut filter 6 results in having the red spectral characteristics. Since the infrared-cut filter 9 serves to cut the light in the infrared zone, the passing light has the emission spectrum for the red radiation as shown in FIG. 5.

Figure 6:
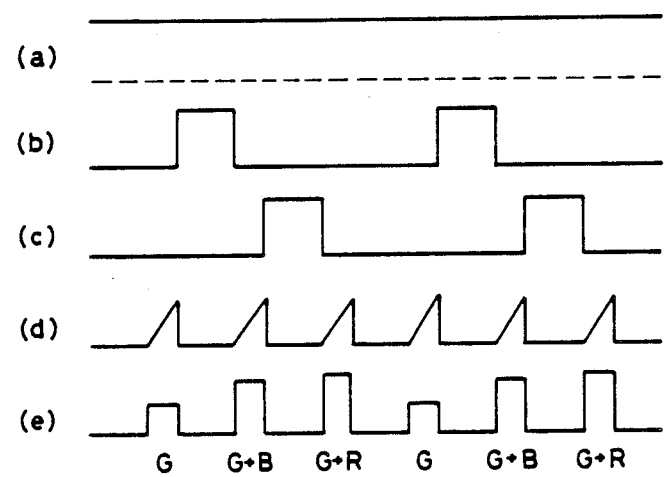
FIG. 6 is a time chart of switching the three fluorescent lamps according to the present invention.

FIG. 6 shows a timing chart for switching on and off the three fluorescent lamps 3, 4, and 5 in accordance with the present invention.

More specifically, FIG. 6-(a) is a timing according to which the green fluorescent lamp 3 propagates green light. FIG. 6-(b) is a timing by which the blue lamp 4 propagates blue light. FIG. 6-(c) is a timing by which the red-purpose lamp 5 propagates the light, which becomes the red light in combination with the sharp-cut filter 6 and the infrared-cut filter 9.

As indicated in FIG. 6, the green lamp 3 is continuously switched on as long as the other lamps 4 and 5 are switched on. A first means is provided for continuously switching on the lamp 3 over analyzing the red, blue, and green components. A second means is provided for alternatively switching on the blue lamps 4 and the red-purpose lamp 5. That is, the blue lamp 4 is switched on, and is prevented from overlapping the switching on of the red-purpose lamp 5.

FIG. 6-(d) is a timing for the CCD image sensor 11 for analyzing the respective color components. FIG. 6-(e) is a timing for the CCD image sensor 11 for outputting the respective signals.

The green components of the color-picture are analyzed in the first timing of the timing of FIG. 6-(d) so that the processing circuit 11 provides the signals corresponding to the green components. Just after the circuit 12 provides the green components' signals, the blue lamp 4 is switched on. At this time, the green lamp 3 and the blue lamp 4 are both on. In synchronization with the switching off of the blue lamp 4, the sensor 11 starts to read-out the color-picture so that it provides the signals representative of the green components to the circuit 12 plus the blue components. The circuit 12 serves to cancel the green components signals from the mixed signals of the green components plus the blue components to get the proper blue components' signals.

Second, the red-purpose lamp 5 is switched on, so that it is on together with the green lamp 3. With the help of the sharp-cut filter 6 and the infrared-cut filter 9, as stated, the red-purpose lamp 5 enables the propagation of the light of the red spectral characteristics with a sufficient amount of light. In synchronization with the switching off of the red-purpose lamp 5, the sensor 11 starts to read-out the color-picture, so that it provides the signals for the green components plus the red components. Similarly, the circuit 12 subtracts the green components' signals from the combination of the green components' signals and the red components' signals to obtain the proper red components' signals.

These operations are repeated to subsequently analyze the color information of the picture on the document 1.

In the embodiment of FIG. 1, the infrared-cut filter 9 is provided. To eliminate the filter 9, either the reflected mirror 7 or 8 should serve to cut the infrared radiation by comprising a filter named a "cold filter".

With the blue fluorescent lamp having a conventional short afterglow time and the green fluorescent lamp having a conventional long afterglow time, according to the present invention, and because of good red-light emitting source can be provided by the red-purpose fluorescent lamp 5 having a short afterglow time in combination with the sharp-cut filter 6 and the infrared-cut filter 9, the switching on and off of all the fluorescent lamps can be accelerated to make it possible to rapidly analyze the blue, green, and red components.

While only certain embodiments of the present invention have been described, it will be apparent to those skilled in the art that various changes and modifications may be made therein without departing from the spirit and scope of the present invention as claimed.

What is claimed is:

1. A color picture analyzing apparatus with an image signal sensor, such as a charge coupled device, that analyzes color components of an original color document, comprising:
   green lamp means for propagating green spectral radiations;
   blue lamp means for propagating blue spectral radiations, said blue lamp means having a minimal afterglow time;
   third lamp means for propagating light having broad band spectral characteristics that include within said broad band red spectral characteristics and having a minimal afterglow time;
   switching means for controlling the operation of said green lamp means, said blue lamp means and said third lamp means during a period in which the color document is analyzed such that said green lamp stays ON at all times, while said third lamp mens and said blue lamp means are turned ON and OFF such that their respective ON times do not overlap; and
   sharpcut filter means for filtering said light having broad band spectral characteristics so as to illuminate the document with light having red spectral characteristics when said switching means turns ON said third lamp means,
   wherein light propagated from said green lamp means, said blue lamps means and said sharp cut filter means illuminates the document which produces a reflection signal containing color components, said reflection signal being input into an image processing circuit that includes the image signal sensor.

2. The apparatus of claim 1, further comprising an infrared-cut filter interposed between the document and the image signal sensor for cutting the radiation in the infrared band from the said reflection signal.

3. The apparatus of claim 1, wherein said third lamp means is a fluorescent lamp for propagating the light covering the red spectral band.

4. The apparatus of claim 3, wherein the fluorescent lamp is of a cool white type.

* * * * *